No. 893,552. PATENTED JULY 14, 1908.
R. SCHULTZ & J. NEUBAUER.
QUACK GRASS PULLER.
APPLICATION FILED SEPT. 9, 1907.
4 SHEETS—SHEET 2.
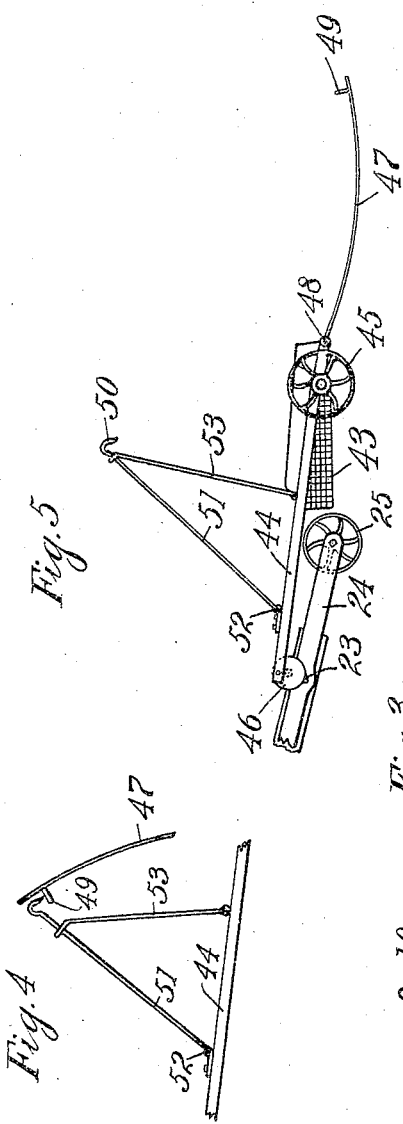
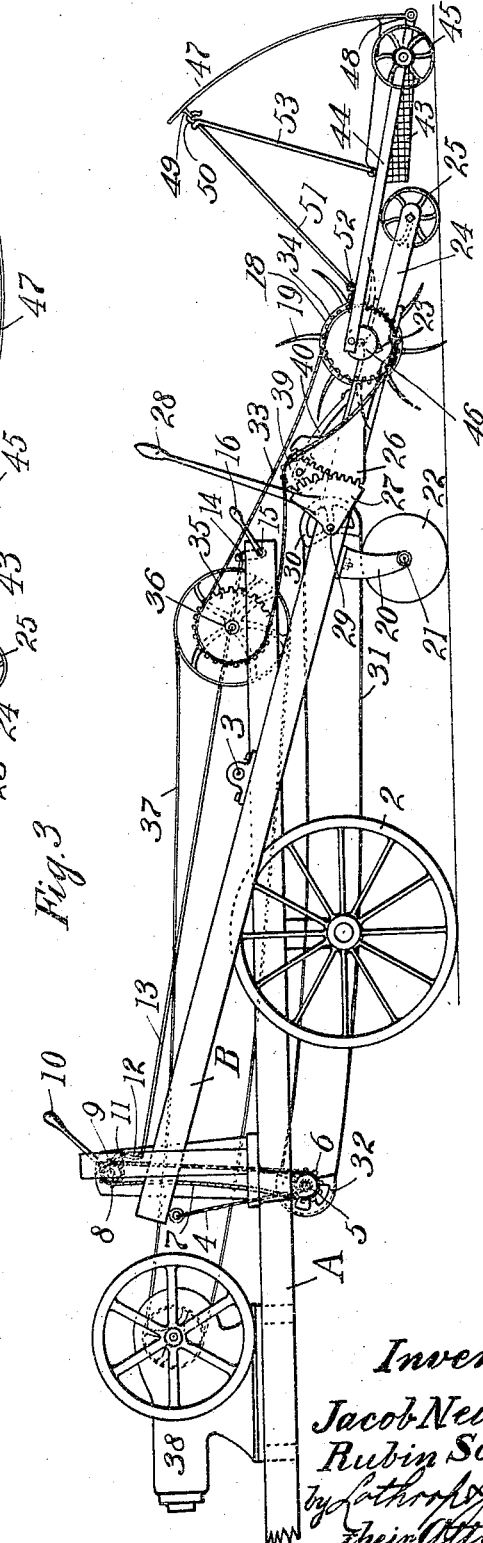
Witnesses
George Voelker
Hattie Smith
Inventors,
Jacob Neubauer
Rubin Schultz
by Lothrop & Johnson
their Attorneys No. 893,552.

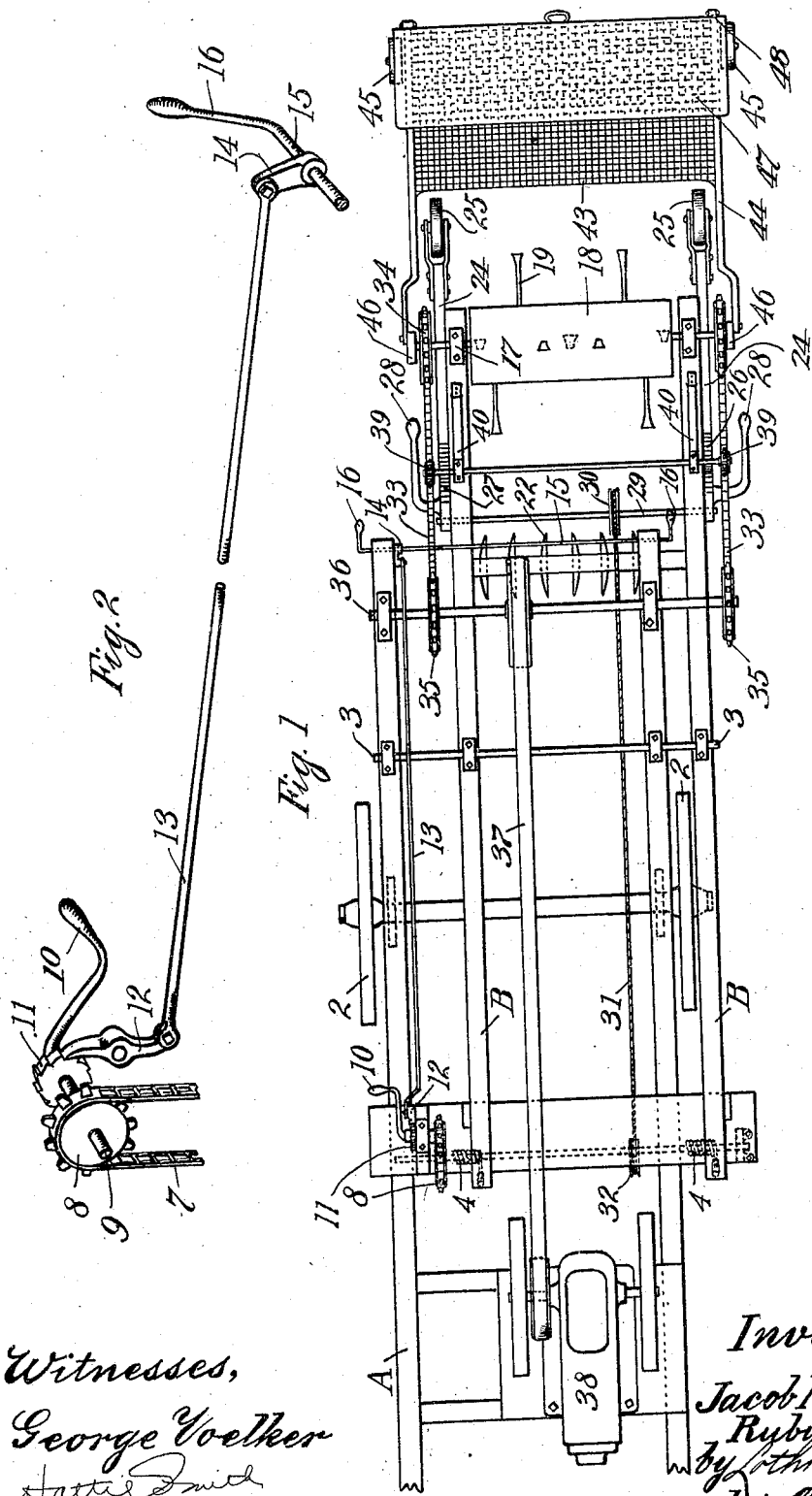

PATENTED JULY 14, 1908.

R. SCHULTZ & J. NEUBAUER.
QUACK GRASS PULLER.
APPLICATION FILED SEPT. 9, 1907.

4 SHEETS—SHEET 3.

Witnesses,
George Voelker
Hattie Smith

Inventors,
Jacob Neubauer
Rubin Schultz
by Lothrop Johnson
their Attorneys.

No. 893,552.    PATENTED JULY 14, 1908.
R. SCHULTZ & J. NEUBAUER.
QUACK GRASS PULLER.
APPLICATION FILED SEPT. 9, 1907.

4 SHEETS—SHEET 4.

Witnesses,
George Voelker

Inventors,
Jacob Neubauer
Rubin Schultz
by their Attorneys.

UNITED STATES PATENT OFFICE.

RUBIN SCHULTZ AND JACOB NEUBAUER, OF WELLS, MINNESOTA.

QUACK-GRASS PULLER.

No. 893,552.        Specification of Letters Patent.        Patented July 14, 1908.

Application filed September 9, 1907. Serial No. 391,880.

*To all whom it may concern:*

Be it known that we, RUBIN SCHULTZ and JACOB NEUBAUER, citizens of the United States, residing at Wells, in the county of Faribault and State of Minnesota, have invented certain new and useful Improvements in Quack-Grass Pullers, of which the following is a specification.

Our invention relates to improvements in quack grass pullers its object being to provide a traveling machine pulling the quack grass roots and also for shaking the dirt therefrom.

To this end our invention consists in the features of construction and combination hereinafter particularly described and claimed.

Figure 6:
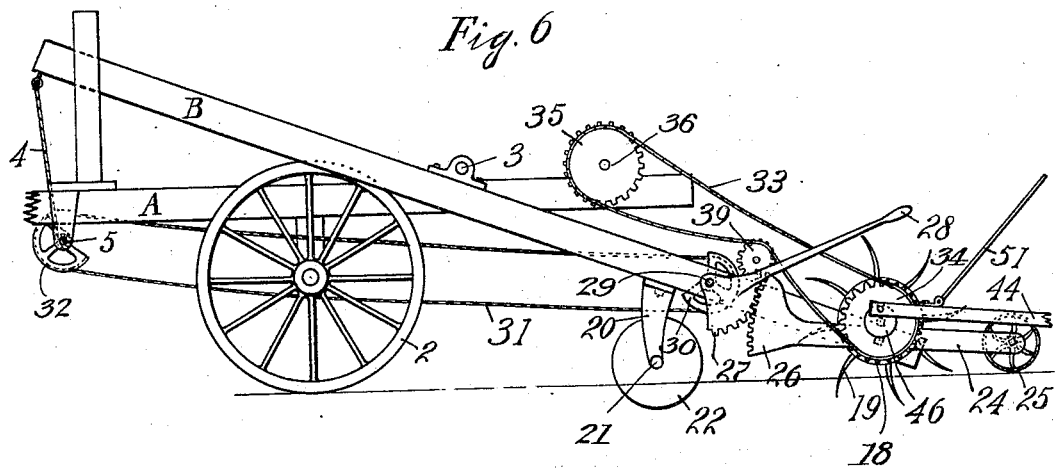
Figure 7:
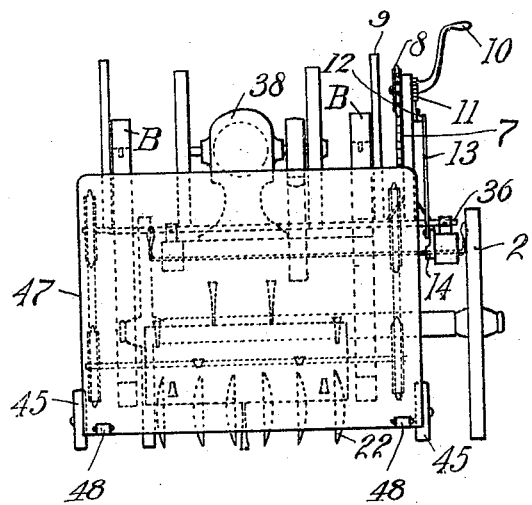
Figure 8:
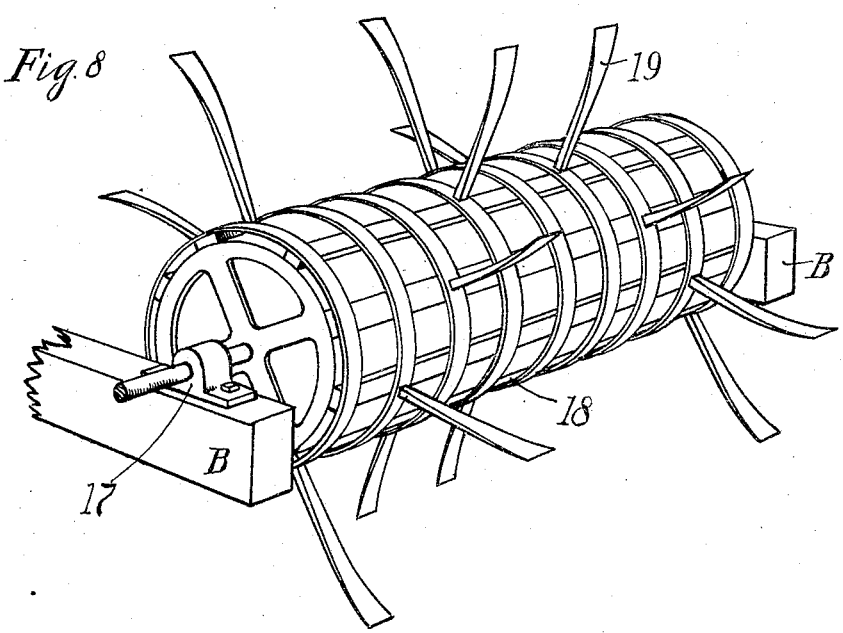
Figure 9:
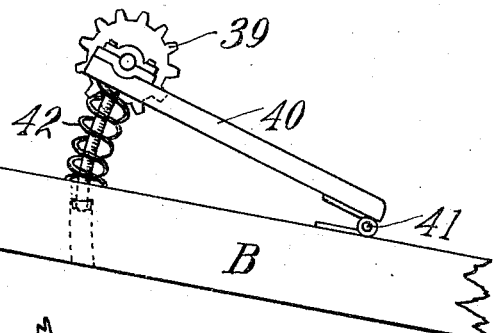
Figure 10:
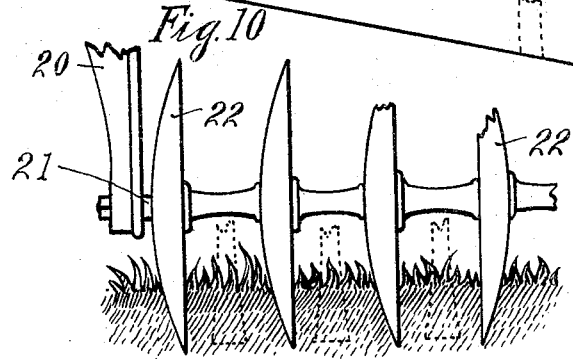

In the accompanying drawings forming part of this specification, Figure 1 is a plan view of our invention, Fig. 2 is a detail view of part of the actuating mechanism, Fig. 3 is a side elevation of our invention, Figs. 4 and 5 are detail side views of part of the mechanism for receiving and shaking the roots, Fig. 6 is a partial side elevation with the digging apparatus in lowered position, Fig. 7 is a front elevation, Fig. 8 is a perspective view of the root puller, Fig. 9 is a side elevation of part of the frame work, and Fig. 10 is a detail view of part of a series of colter wheels.

In the drawings A represents a suitable carriage mounted upon wheels 2, the front wheels not being shown. Having pivotal support 3 upon the rear of the carriage is the frame B for supporting the grass pulling apparatus. The front end of the tilting frame B is connected by a cable 4 with a winding shaft 5 supported transversely underneath the carriage. The shaft 5 carries a sprocket 6 connected by a chain 7 with a sprocket 8 mounted upon a shaft 9 journaled above the carriage, the shaft 9 being provided with a suitable handle 10. Also mounted upon the shaft 9 is a ratchet wheel 11 with which engages one end of the pivoted pawl 12, the other end of the pawl being connected by a rod 13 with a crank 14 mounted upon a transverse shaft 15 journaled upon the rear end of the frame and provided at its opposite ends with handles 16. Thus when the pawl 12 is interlocked with the ratchet wheel 11, as shown in Fig. 2, the sprocket 8 and connecting mechanism will be held from turning.

Having journal support 17 upon the rear end of the tilting frame B is a transverse cylinder 18 carrying a series of suitably supported outwardly extending teeth 19, the teeth alternating in position as shown in Fig. 8, so as to more effectively remove the quack grass roots. Journaled in the downwardly extending arms 20 in front of the cylinder 18 is a shaft 21 carrying a series of rotary knives or colter wheels 22 for cutting up the sod in advance of the removing teeth.

Having pivotal support 23 upon the rear end of the tilting frame B are side bars 24 having journaled at their lower ends supporting wheels 25. The front ends of the bars 24 each carry a toothed quadrant 26 intermeshing with a similar toothed quadrant 27 supported upon the frame B and carrying actuating handles 28. Secured upon the shaft 29 of the toothed quadrants 27 is a semi-circular segment 30 to which is attached one end of a cable 31 the opposite end being attached to a similar segment 32 secured upon the shaft of the sprocket 6.

The tooth carrying cylinder is actuated by means of endless chains 33 running over sprockets 34 carried by the shaft and over sprockets 35 carried by a shaft 36 journaled upon the carriage A. The shaft 36 has belt connection 37 with a suitable engine 38 supported upon the carriage A. Suitable idler sprockets 39 engage with the chains 33, said sprockets being journaled upon arms 40 having hinge support 41 upon the side bars of the frame B and being held against the endless chain by springs 42.

In order to receive the quack grass roots as removed from the ground we provide an open bottom receptacle 43 carried by the frame 44, the frame being provided at its rear end with carrying wheels 45, and being connected at its front ends with eccentrics 46 mounted upon the ends of the cylinder shaft. The receptacle 43 is provided with a rear wall 47 having hinge support 48 at its lower end to the receptacle and being provided at its upper end with an eye 49 into which fits a hook 50 carried by the upper end of a rod 51. The rod 51 has hinge support 52 upon the frame work 44 and slides loosely through the looped end of a rod 53, the rod 53 being hinged to the frame work 44.

In operation the machine will be drawn forward in the ordinary manner. When it is desired to remove the quack grass the pawl 12 will be released through the medium of the handle 16 and by then turning one of the handles 28 the rear end of the frame B will be moved, as shown in Fig. 6, carrying the colter wheels and teeth of the cylinder into the ground. It will be evident that the supporting wheels 25 will remain upon the ground in all positions of the tilting frame. As the frame B is tilted, as above described, the semi-circular segment 30 will be turned turning the segment 32 and winding up the cable 4. When it is desired to raise the rear end of the frame the parts will be oppositely actuated. It will be evident that the frame may be similarly tilted by the handles 10 in which case the winding shaft will be actuated from the endless chain 7 turning the semi-circular segment 32 and turning the quadrants through the medium of the cable 31. When the tilting frame has been turned to the proper position it may be locked in such position by the pawl 12.

As the quack grass roots are removed from the ground by the cylinder teeth they will be taken into the receptacle and as the receptacle is constantly vibrated by its eccentrics 46 the dirt will be shaken from the roots and will drop through the open-work bottom. When it is desired the rear wall 47 of the receptacle may be lowered as shown in Fig. 5 to allow the roots to be removed.

We claim:

1. In an apparatus of the class described, the combination with a carriage, of a frame having pivotal support thereon, a toothed cylinder carried by the rear end of said frame, colter wheels extending downwardly from the frame, and means securing said frame in adjusted positions.

2. In an apparatus of the class described, the combination with a carriage, of a frame having pivotal support thereon, a toothed cylinder journaled in the rear end of said frame, colter wheels extending downwardly from the frame in front of said cylinder, a cable connecting the front end of said frame with the carriage, and means for winding up said cable.

3. In an apparatus of the class described, the combination with a carriage, of a frame having pivotal support thereon, a toothed cylinder journaled in the rear end of said frame, carrying wheels pivotally connected with the rear end of said frame, and means securing said frame in adjusted positions.

4. In an apparatus of the class described, the combination with a carriage, of a frame having pivotal support thereon, a toothed cylinder journaled in the rear end of said frame, rear wheels pivotally supporting said frame, and means turning said frame into position carrying the teeth of said cylinder into the ground with the rear wheels resting upon the ground.

5. In an apparatus of the class described, the combination with a wheeled carriage, of a frame having pivotal support thereon, means for adjusting said frame upon its pivot, a toothed cylinder journaled in the rear end of said frame, rear carrying wheels, framework for said carrying wheels pivotally supporting the rear end of said pivoted frame, and means for turning said wheel frame upon its pivot as said pivotally supported frame is adjusted to hold said wheels upon the ground.

6. In an apparatus of the class described, the combination with a wheeled carriage, of a frame having pivotal support upon said carriage, a rotary toothed digger journaled in the rear end of said frame, carrying wheels pivotally supporting the rear end of said frame, a toothed quadrant pivotally supported upon said frame, a quadrant supported from said wheels and intermeshing with said toothed quadrant, a windlass, and operative connection between the front end of said frame and said windlass.

In testimony whereof we affix our signatures in presence of two witnesses.

RUBIN SCHULTZ.
JACOB NEUBAUER.

Witnesses:
CHAS. E. CONANT,
OSCAR LARSON.